(12) United States Patent
Shuck et al.

(10) Patent No.: US 10,639,742 B2
(45) Date of Patent: May 5, 2020

(54) VESSEL FOR JOINING MATERIALS

(71) Applicant: Rolls-Royce Corporation, Indianapolis, IN (US)

(72) Inventors: Quinlan Yee Shuck, Indianapolis, IN (US); Scott Nelson, Carmel, IN (US); Raymond Xu, Carmel, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 793 days.

(21) Appl. No.: 15/013,489

(22) Filed: Feb. 2, 2016

(65) Prior Publication Data

US 2017/0173733 A1    Jun. 22, 2017

Related U.S. Application Data

(60) Provisional application No. 62/269,782, filed on Dec. 18, 2015.

(51) Int. Cl.
*B23K 26/12* (2014.01)
*B23K 1/005* (2006.01)
*B23K 103/00* (2006.01)

(52) U.S. Cl.
CPC .......... *B23K 26/127* (2013.01); *B23K 1/0056* (2013.01); *B23K 2103/52* (2018.08)

(58) Field of Classification Search
CPC . B23K 1/0056; B23K 2103/52; B23K 26/127
USPC .............. 219/121.64, 121.63, 121.68, 121.7, 219/121.86, 121.67, 121.69, 121.84; 266/165, 274, 276, 255; 269/46; 432/198, 206, 254.2; 228/124.5, 232, 228/262.2

See application file for complete search history.

(56) References Cited

U.S. PATENT DOCUMENTS

| | | | |
|---|---|---|---|
| 3,648,009 A | 3/1972 | Steigerwald | |
| 3,681,970 A | 8/1972 | Wells | |
| 4,419,562 A | 12/1983 | Jon et al. | |
| 4,492,843 A * | 1/1985 | Miller | B23K 26/123 219/121.63 |
| 4,727,237 A * | 2/1988 | Schantz | B23K 26/123 219/121.63 |
| 4,865,461 A | 9/1989 | Taylor et al. | |
| H1102 H | 9/1992 | McClellan | |
| 6,262,390 B1 * | 7/2001 | Goland | C04B 41/009 219/121.84 |
| 6,585,146 B2 | 7/2003 | Shepard | |

(Continued)

FOREIGN PATENT DOCUMENTS

| JP | 62050098 A | * | 3/1987 | ............. B05B 7/228 |
|---|---|---|---|---|
| JP | 2007220167 A | * | 8/2007 | |

OTHER PUBLICATIONS

JP_2007220167_A_translation2.pdf.*

*Primary Examiner* — Dana Ross
*Assistant Examiner* — Ket D Dang
(74) *Attorney, Agent, or Firm* — Brink Gilson & Lione

(57) ABSTRACT

A system and method for joining materials. The system includes a sealed chamber having a window. A laser is disposed external to the sealed chamber and heats objects in the sealed chamber through the window. The method includes sealing objects to be joined in the sealed chamber with a controlled environment and heating the objects with a laser disposed external to the sealed chamber.

17 Claims, 4 Drawing Sheets

(56) References Cited

U.S. PATENT DOCUMENTS

| | | | |
|---|---|---|---|
| 6,586,704 B1 * | 7/2003 | Cockeram | B32B 18/00 219/121.64 |
| 6,862,944 B2 | 3/2005 | Savitski | |
| 6,991,765 B2 | 1/2006 | Neilson et al. | |
| 7,651,264 B2 | 1/2010 | Matsumoto et al. | |
| 7,909,505 B2 | 3/2011 | Alexandrov et al. | |
| 8,334,362 B2 | 12/2012 | Alpeter et al. | |
| 8,608,373 B2 | 12/2013 | Ando et al. | |
| 2004/0259387 A1 * | 12/2004 | Yamazaki | B23K 26/0604 438/795 |
| 2006/0065651 A1 * | 3/2006 | Zhang | B23K 26/0861 219/121.86 |
| 2009/0206065 A1 | 8/2009 | Kruth et al. | |
| 2012/0106085 A1 * | 5/2012 | Yamazaki | G01J 5/029 361/705 |
| 2012/0236896 A1 * | 9/2012 | Takida | B23K 26/0853 372/55 |
| 2014/0209576 A1 * | 7/2014 | Ozbaysal | F01D 5/286 219/121.64 |
| 2015/0258633 A1 * | 9/2015 | Hori | B23K 26/24 228/47.1 |

\* cited by examiner

VESSEL FOR JOINING MATERIALS

RELATED APPLICATIONS

The present patent document claims the benefit of the filing date under 35 U.S.C. § 119(e) of Provisional U.S. Patent Application Ser. No. 62/269,782, filed Dec. 18, 2015, which is hereby incorporated by reference.

BACKGROUND

1. Technical Field

The present disclosure relates to the joining of materials and more particularly to joining materials such as ceramic matrix composites and refractory metals.

2. Background Information

Ceramic matrix composites are a type (CMC) of composite material and include ceramic fibers embedded in a ceramic matrix. While ceramics on their own are brittle, cracking easily, ceramic matrix composites are durable and have a high crack resistance. They are useful in situation in fields requiring high-temperature durability and resistance to corrosion. Refractory metals are a class of metals that are resistant to heat and wear. Like ceramic matrix composites, they are durable at high-temperatures.

Because ceramic matrix composites and refractory metals melt at high temperature, pieces are often joined using brazing. In brazing, a joining material is melted and flows between pieces, where it hardens, joining the pieces. Such joining procedures are typically carried out in either a large furnace, or in an open environment. In a furnace, the entire piece may be heated in a vacuum or inert atmosphere to melt the brazing material. In an open environment, the piece may be heated locally at the spot to be joined. This local heating allows the piece to be heated and cooled quickly, and allows brazing of pieces that are too large for a furnace or may be damaged by furnace heating of the entire piece. While local heating is effective, many joining materials react with oxygen and/or nitrogen, so it is beneficial if the piece is heated and cooled as quickly as possible to deter the joining materials from reacting with oxygen and/or nitrogen. In some instances, the local heating of a piece may be done through the use of a laser. The laser is able to direct a precise beam to heat the piece at a precise location.

To inhibit the either the piece or the filler material from reacting with oxygen or nitrogen, ambient gas may be shielded from the piece. For example, a shielding gas may be directed to the piece as it is heated to inhibit reaction with the ambient air. Or the piece and the heat source may be placed in a sealed environment where the piece may be heated in a controlled environment.

Each of these techniques for joining materials have potential downsides. Heating and cooling the piece quickly allows the joint to react with the ambient air, even if only momentarily. Similarly, while shielding gas may inhibit reaction of the ambient air with the piece or the filler, some reaction may still take place. Heating the piece in a controlled environment may suitably inhibit the reaction with ambient air, but a sealed environment large enough to house the pieces being joined and the heat source is typically very expensive.

BRIEF SUMMARY

It would be beneficial to develop a low cost system for joining materials in a low oxygen/nitrogen environment.

In one aspect, a system for joining materials is disclosed. The system includes a vessel having an inner chamber sealed from an environment external to the vessel, a laser disposed external to the vessel and configured to heat material through electromagnetic radiation, and a window transparent to the electromagnetic radiation of the laser and providing a line of sight between the laser and the material in the chamber.

In some embodiments, the system includes a reactive metal disposed in the inner chamber with the reactive metal in a line of sight of the laser. In some embodiments, the system further includes a substrate material in the inner chamber. In some embodiments, the laser has a first configuration aimed at the reactive metal and a second configuration that is not aimed at the reactive metal.

In some embodiments, the window is configured to be removable from the vessel. In some embodiments, the vessel has an upper portion and a lower portion removable from the upper portion and the system further comprises a clamp securing the lower portion to the upper portion. In some embodiments, the system includes an inlet in fluid communication with the inner chamber and configured to receive a purge gas source. In some embodiments, the system includes an outlet in fluid communication with the inner chamber and configured to remove a gas from the inner chamber.

In another aspect, a method for joining materials is disclosed. The method includes placing a substrate material in a chamber of a sealable vessel having a transparent window, placing a joining material in the chamber proximate the substrate material, sealing the vessel with the substrate material and the joining material in the chamber, directing a laser light source through the transparent window to heat the joining material.

In some embodiments, the method further includes introducing a purge gas into the chamber after sealing the vessel and removing existing gas within the vessel.

In some embodiments, the method includes placing a reactive metal in the inner chamber prior to sealing the chamber and directing the laser light source through the transparent window to heat the reactive metal prior to heating the joining material.

In some embodiments, the vessel is placed in a controlled environment prior to sealing the vessel.

In some embodiments, the method further includes evacuating the chamber prior to heating the joining material.

In another aspect, a vessel for joining materials with an external laser is disclosed. The vessel includes a lower portion having a first cavity with a base configured to hold a substrate material, an upper portion having a second cavity, the first cavity and second cavity together forming an inner chamber sealed from an ambient environment when the upper portion is secured to the lower portion, a clamping mechanism for securing the upper portion to the lower portion, and a window disposed in the upper portion, the window providing a line of sight to the base.

In some embodiments, the window is removable. In some embodiments, the vessel further includes an inlet configured to receive a purge gas and an outlet configured to exhaust gas from within the inner chamber.

In some embodiments, the upper portion and the lower portion each have a ring extending laterally and wherein the clamping mechanism is a ring clamp.

In some embodiments, the base is further configured to hold a reactive metal. In some embodiments, a gasket is disposed between the upper portion and the lower portion. In some embodiments, the window is disposed opposite the base.

DETAILED DESCRIPTION

Figure 1:
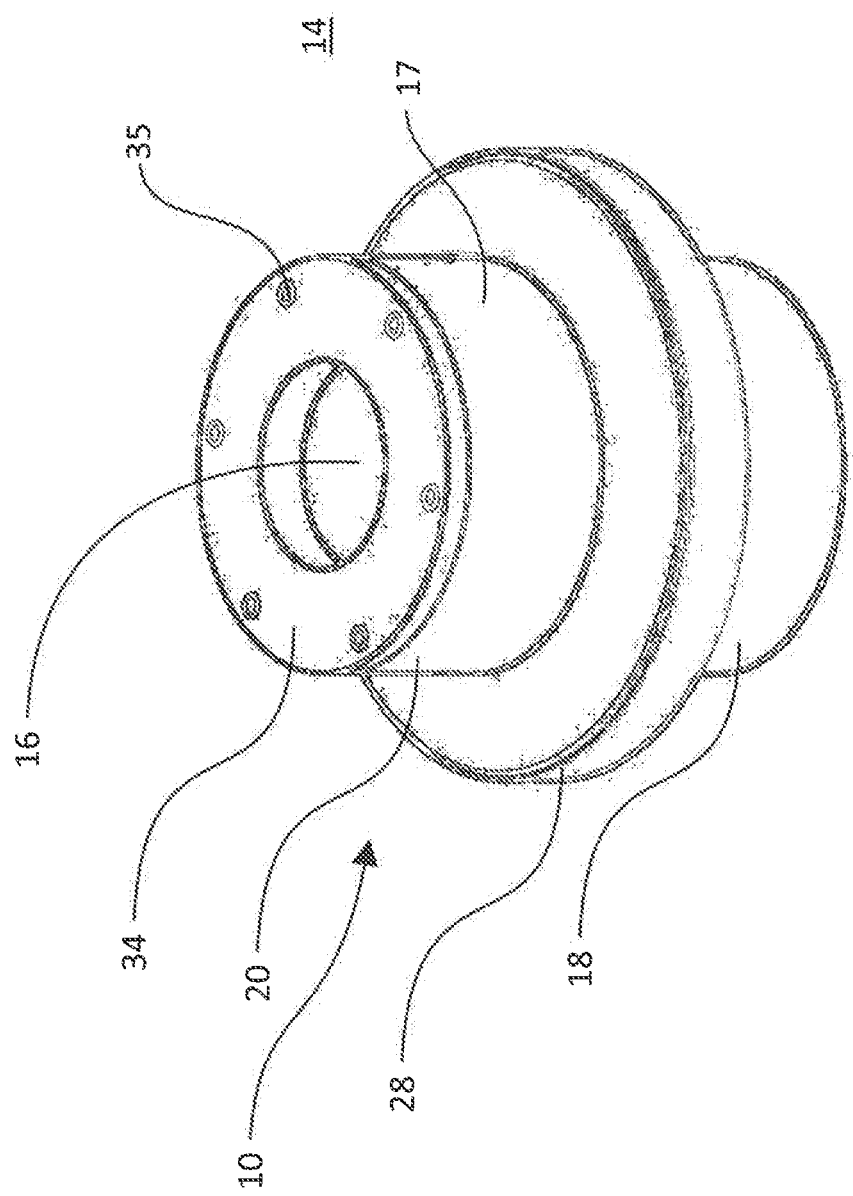
FIG. 1 illustrates an example of a vessel for joining materials.
Figure 2:
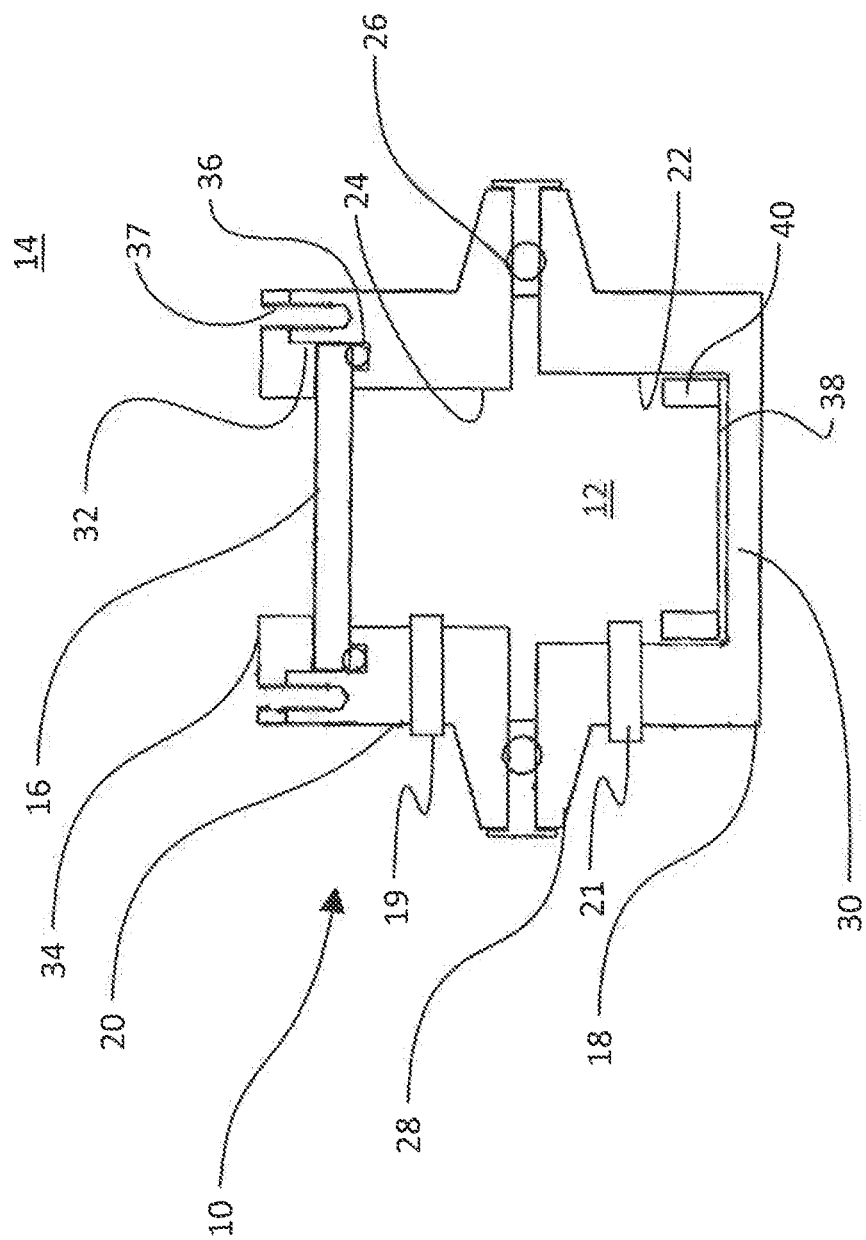
FIG. 2 illustrates a schematic of a cross-section of a vessel for joining materials.

FIG. 1 illustrates a vessel 10 for joining a substrate material using a joining material while isolating the substrate material and joining material from an ambient environment during localized heating. For example, the substrate material may be a ceramic matrix composite or a refractory metal and the joining material may be a powdered metal or other reactant. FIG. 2 illustrates a schematic cross section of the vessel 10 of FIG. 1. The following description will be in reference to FIG. 1 and FIG. 2 together. The vessel 10 encloses a sample chamber 12, which is isolated from the ambient environment 14. The vessel 10 has a window 16 providing optical access into the chamber 12. The window 16 is a material that is transparent to light at a frequency used by a laser for heating components within the chamber 12.

The vessel 10 includes a lower portion 18 and an upper portion 20. The lower portion 18 has a lower cavity 22 that forms a first portion of the chamber 12 and the upper portion has an upper cavity 24 that forms a second portion of the chamber 12. The upper portion 20 and the lower portion 18 may each have a ring 28 protruding from a cylindrical surface 17 of the vessel 10. The upper portion 20 and the lower portion 18 are separated by a gasket 26 that forms a seal between the two rings 28. A ring clamp (not shown for clarity) may encompass a perimeter of the vessel 10 about the rings 18 and force the upper portion 20 and lower portion 18 together, compressing the gasket 26. The chamber 12 is accessible by removing the ring clamp, freeing the upper portion 20 from the lower portion 18.

The window 16 is secured to the upper portion 20 opposite a base 30 of the lower portion 18. The window 16 is sized and shaped to fit in a recess 32 of the upper portion 20 and is held in place by a cap 34. The cap 34 is secured to the upper portion 20 through cap screws 35 extending through the cap 34 and into a threaded recess 37 of the upper portion 20. The cap screws 35 contact the cap 34 and press it towards the upper portion 20, causing the cap 34 to contact the window 16. The contact presses the window 16 towards the upper portion 20 where the window 16 contacts a gasket 36 between the upper portion 20 and the window 16. The gasket 36 provides an air tight seal between the window 16 and the interior chamber 12.

While the vessel 10 has been described with regard to the particular structure shown in FIG. 2, one of ordinary skill in the art will recognize that other structures and techniques are possible and embodiments are not limited to this particular structure. For example, in one embodiment the upper and lower portion of the vessel 10 may be a single unitary piece with access to the chamber 12 provided through the removable window 16. In other embodiments, the window 16 may be permanently fixed to the upper portion 20 of the vessel 10 with access to the chamber 12 provided by separating the upper portion 20 and the lower portion 18 of the vessel 10. In still other embodiments, the upper portion 20 and the lower portion 18 may be secured to one another through cap screws passing through the ring 28 of the upper portion 20 and threaded into the ring 28 of the lower portion.

In use, a substrate material 38 is disposed in the chamber 12. The substrate material 38 may rest on the base 30 of the lower portion 18. The substrate 38 may be a ceramic matrix composite or a refractory metal. The joining material is placed in the chamber 12 proximate the substrate material 38. A known environment is introduced into the chamber 12 using various techniques. In one embodiment, the vessel 10 may be assembled within a known environment. For example, the vessel 10 may be assembled within a large, environmentally controlled chamber. Thus the environment within the chamber 12 would be known at the time of assembly and the known environment would be maintained in the chamber 12 after removal of the vessel 10 from the environmentally controlled chamber. In other embodiments, the chamber 12 may be purged with a purge gas to introduce a known environment to the chamber 12. For example, an inlet 19 may be configured to receive a purge gas from a gas source and an outlet 21 may be configured to vent the existing environment of the chamber 12. As the purge gas is introduced through the inlet 19, the existing environment in the chamber 12 would vent through the outlet 21 until the environment of the chamber 12 comprised substantially only the purge gas. In other embodiments, the chamber 12 may be evacuated by either assembling the vessel 10 in a vacuum environment, or by applying a vacuum to the chamber 12 after assembly, such as through the inlet 19 or outlet 21.

Figure 3:
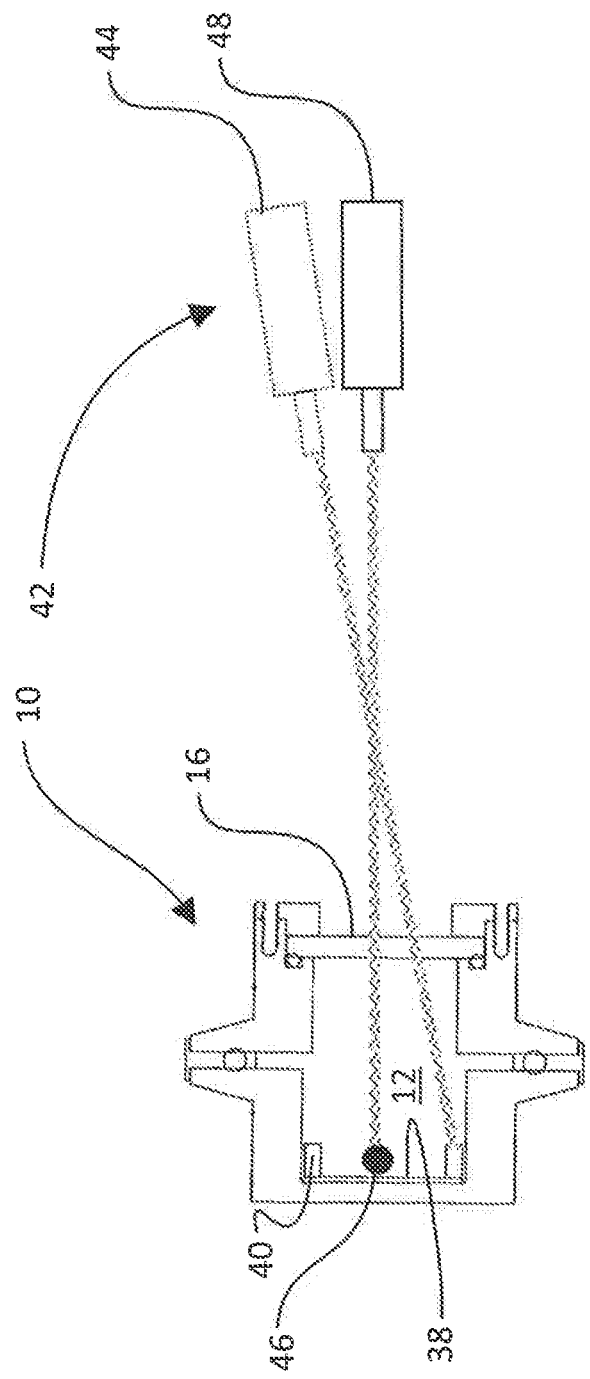
FIG. 3 illustrates a schematic cross-section of the vessel of FIG. 2 with a laser for heating materials within the vessel.

FIG. 3 illustrates the vessel 10 of FIG. 2 in use with a laser 42 configured to heat components within the chamber 12. In some embodiments, the controlled environment of the chamber 12 may be further purified by including a reactive material 40 in the chamber 12 at the time the vessel 10 is assembled. The reactive material 40 is then reacted in the controlled environment within the chamber 12 to bond with any unwanted gases. For example, in some embodiments it is desirable for nitrogen and oxygen levels to be minimized within the controlled environment of the chamber 12. A reactive material 40, such as titanium or zirconium, is positioned within the chamber 12 in view of the window 16. The laser 42 is aimed at the reactive material 40 through the window 16, as shown by laser 44, to heat the reactive material 40, causing it to react and bond with any residual oxygen and/or nitrogen within the chamber 12. The use of the reactive material 40 may result in a controlled environment within the chamber 12 that is more highly purified than otherwise possible.

In use, the substrate material 38 and the joining material 46 are placed within the chamber 12 in view of the window 16. The vessel 10 is then assembled and the controlled environment is introduced into the chamber 12. Once the vessel 10 is sealed with the controlled environment in the chamber 12, the reactive material 40 may then be reacted to further purify the controlled environment. Once a suitable controlled environment is established in the chamber 12, a laser 48 is aimed through the window 16 at the substrate material 38 and the joining material 46. The laser 48 may be the same laser 44 used to heat the reactive material 40, or it may be a separate laser in some embodiments. The energy of the laser 48 passes through the transparent window 16 and is directed on the substrate material 38 and the joining material 46, heating them to a desired temperature for joining.

After the substrate material 38 and the joining material 46 have cooled, they may be removed from the chamber 12. In embodiments having a ring clamp holding the upper portion 20 and the lower portion 18 together, the ring clamp is released allowing the upper portion 20 to be removed from the lower portion 18 exposing the chamber 12. In embodiments in which the vessel 10 is a unitary design, the cap screws 35 may be loosened freeing the cap 34. With the cap 34 free, the window 16 is removed providing access to the chamber 12. One of ordinary skill in the art will recognize that access to the chamber 12 is dependent upon the structure of the vessel 10 and may vary.

Figure 4:
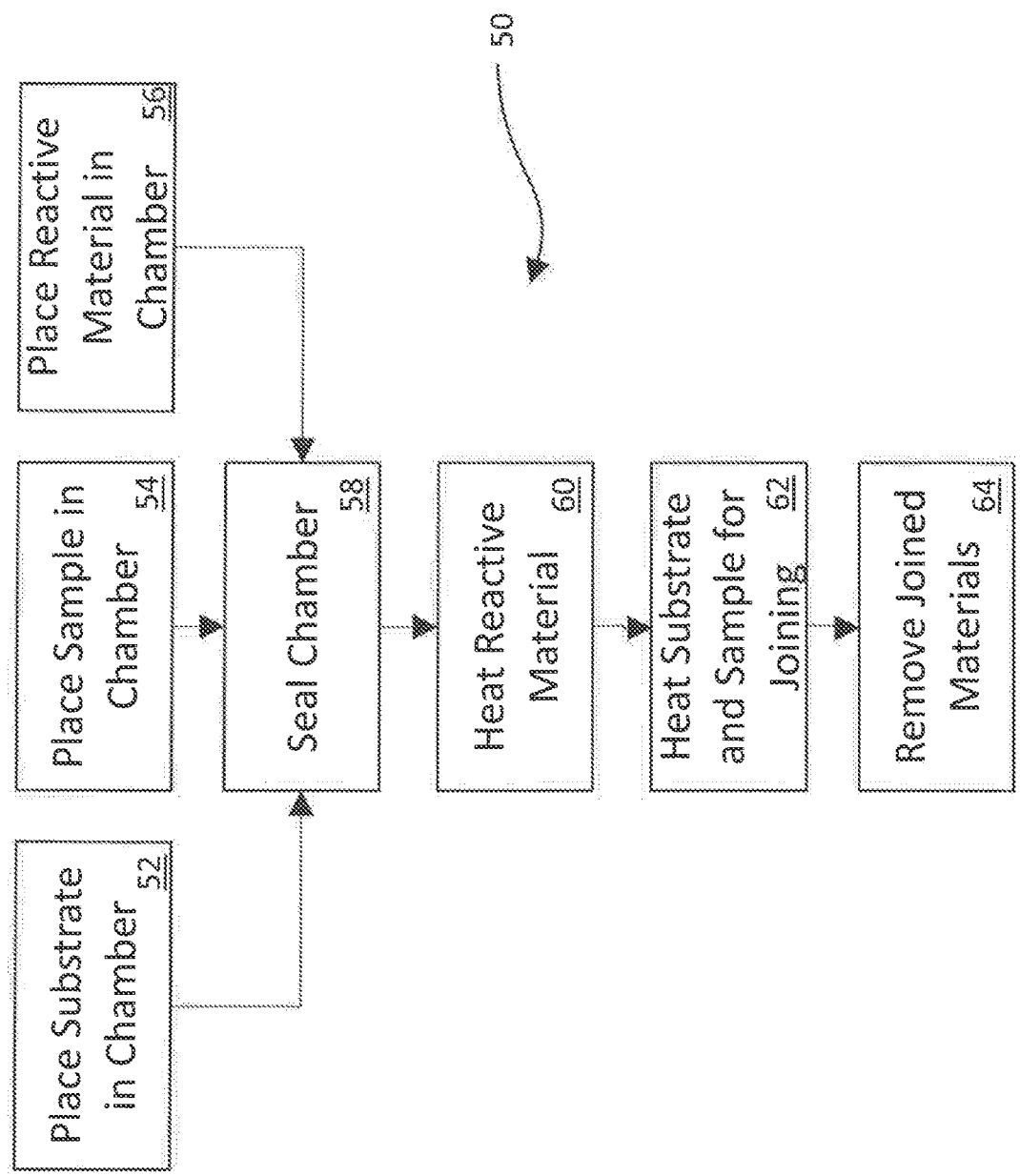
FIG. 4 illustrates a flowchart of a method for joining materials.

FIG. 4 illustrates a flowchart of a method 50 for joining materials. The method will be described in relation the vessel 10 described previously, but one of skill in the art will recognize that the method may be applied to any vessel having a controlled environment and a window for passing a laser heat source. In block 52, a substrate material 38 is placed in the chamber 12. One of skill in the art will recognize that the substrate material 38 may comprise more than one piece of material to be joined using the joining material 46. For example, the substrate material 38 may comprise two pieces of ceramic matrix composite being joined together, a piece of ceramic matrix composite and a refractory metal, or two refractory metals, among other combinations. In block 54, a joining material 46 is placed in the chamber 12 proximate the substrate material 38. The substrate material 38 and the joining material 46 may be placed in the chamber at the same time, or the order may vary. In embodiments in which further refinement of the controlled environment within the chamber is desired, in block 56, a reactive material is placed in the chamber. In block 58, the chamber is sealed with the substrate material and sample material inside. If the vessel was not assembled in environmentally controlled enclosure, at block 60 a controlled environment is introduced into the chamber, either by purging it with a gas or evacuating the chamber through an outlet. If the vessel was assembled within an environmentally controlled chamber, then it may be removed once the chamber is sealed.

In block 62, the laser is optionally directed through the window of the vessel and directed on the reactive material to further refine the environment within the chamber. Once the reactive material is suitably reacted, the laser is directed through the window at the substrate material 38 and the joining material 46 for heating. The joining material 46 is then heated to a joining temperature and the substrate material 38 is joined. Once joined, the substrate material 38 may be removed from the chamber in block 64.

It should be understood that various changes and modifications to the presently preferred embodiments described herein will be apparent to those skilled in the art. For example, instead of the vessel described previously, a different vessel being sealed with a transparent window may be utilized in the method. Additionally, while not described in detail, one of ordinary skill in the art will recognize that the different embodiments may be used in combination with one another. Furthermore, while the embodiments are described in relation to brazing a high temperature substrate material such as a ceramic matrix composite or a refractory metal, one of skill in the art will recognize that embodiments may be used to locally heat materials in a controlled environment. For example, embodiments may be used to heat a reactive powder to a melting temperature for joining in a low oxygen environment.

The invention claimed is:

1. A system for heating a substrate material in a controlled environment, the system comprising:
   a vessel comprising an inner chamber sealable from an environment external to the vessel, the vessel configured to receive a reactive material and the substrate material in the inner chamber, the reactive material located in the inner chamber separate from the substrate material, the reactive material configured to react, in response to being heated, with gas disposed in the inner chamber to purify the inner chamber after the inner chamber is sealed;
   a laser disposed external to the vessel and configured to heat the reactive material and then heat the substrate material after the reactive material begins to react with the gas, wherein the laser has a first configuration aimed at the reactive material and a second configuration that is not aimed at the reactive material; and
   a window transparent to electromagnetic radiation of the laser and providing a first line of sight between the laser in the first configuration and the reactive material and a second line of sight between the laser in the second configuration and the substrate material within the inner chamber.

2. The system of claim 1, wherein the window is configured to be removable from the vessel.

3. The system of claim 1, wherein the vessel has an upper portion and a lower portion removable from the upper portion, wherein the system further comprises a clamp securing the lower portion to the upper portion.

4. The system of claim 1, further comprising an inlet in fluid communication with the inner chamber and configured to receive a purge gas source.

5. The system of claim 1, further comprising an outlet in fluid communication with the inner chamber and configured to remove the gas from the inner chamber.

6. The system of claim 1, wherein the substrate material comprises a ceramic matrix composite substrate.

7. The system of claim 1, wherein the laser is aimed at the substrate material in the second configuration.

8. The system of claim 7, wherein the reactive material is spaced apart from the substrate material in the inner chamber of the vessel.

9. A method for joining a substrate material, the method comprising:
   placing the substrate material in an inner chamber of a sealable vessel having a transparent window;
   placing a joining material in the inner chamber proximate the substrate material;
   placing a reactive material in the inner chamber at a location of the inner chamber separate from the substrate material, wherein the reactive material reacts with gas in the inner chamber in response to being heated;
   sealing the vessel with the substrate material, the joining material, and the reactive material in the inner chamber;
   purifying the sealed inner chamber by directing a laser light source to a first line of sight through the transparent window to heat the reactive material and cause the reactive material to react with gas in the sealed inner chamber; and
   redirecting, after directing the laser light source to heat the reactive material, the laser light source to a second line of sight through the transparent window to heat the joining material to a joining temperature.

10. The method of claim 9, further comprising introducing a purge gas into the inner chamber after sealing the vessel and removing at least a portion of the gas within the vessel.

11. The method of claim 9, wherein the vessel is placed in a controlled environment prior to sealing the vessel.

12. The method of claim 9, further comprising evacuating the inner chamber of at least a portion of the gas prior to purifying the sealed inner chamber.

13. A vessel for joining a substrate material using an external laser, comprising:
   a lower body comprising a first cylindrical portion and a first ring portion that radially protrudes from an outer surface of the first cylinder portion, the first ring portion and the first cylindrical portion together defining a first cavity, the first cylindrical portion comprising a base configured to hold the substrate material in the first cavity;
   an upper body comprising a second cylindrical portion and a second ring portion that radially protrudes from an outer surface of the second cylindrical portion, the second cylindrical portion and the second ring portion together defining a second cavity, the first cavity and second cavity together forming an inner chamber sealed from an ambient environment when the first ring portion is secured to the second ring portion;
   a ring clamp for securing the first ring portion to the second ring portion, wherein the ring clamp extends around a perimeter of the vessel where the first ring portion joins the second ring portion; and
   a window material detachably coupled to the second cylindrical portion, the window material providing a line of sight to the base, wherein a first gasket is disposed between the window material and the second cylindrical portion, and a second gasket is disposed between the first rind portion and the second ring portion.

14. The vessel of claim 13, further comprising a cap removably fastened to the second cylindrical portion and configured to retain the window material against the first gasket.

15. The vessel of claim 13, further comprising an inlet configured to receive a purge gas and an outlet configured to exhaust gas from within the inner chamber.

16. The vessel of claim 13, wherein the base is further configured to hold a reactive material.

17. The vessel of claim 13, wherein the window material is disposed opposite the base.

* * * * *